United States Patent [19]

Hayward et al.

[11] 4,038,423

[45] July 26, 1977

[54] FOOD BAR

[75] Inventors: James R. Hayward, McHenry; William L. Keyser, East Dundee; Walter J. Zielinski, Ingleside, all of Ill.

[73] Assignee: The Quaker Oats Company, Chicago, Ill.

[21] Appl. No.: 710,453

[22] Filed: Aug. 2, 1976

[51] Int. Cl.² .......................... A23J 3/00; A23G 3/00
[52] U.S. Cl. ........................................ 426/72; 426/90; 426/103; 426/124; 426/307; 426/571
[58] Field of Search ................ 426/72, 99, 90, 103, 426/89, 392, 660, 532, 572, 582, 656, 801, 662, 302, 124, 307

[56] References Cited

U.S. PATENT DOCUMENTS

| | | | |
|---|---|---|---|
| 3,607,309 | 9/1971 | Olney | 426/571 |
| 3,684,528 | 8/1972 | Batey | 426/571 |
| 3,793,464 | 2/1974 | Rusch | 426/99 |
| 3,895,105 | 7/1975 | Colten | 426/662 |

*Primary Examiner*—Jeanette M. Hunter
*Attorney, Agent, or Firm*—Charles J. Hunter

[57] ABSTRACT

A food bar is disclosed comprising a base and a coating thereon. The base of the food bar contains marshmallow fortified with a high protein ingredient of reduced water binding capability. The coating of the food bar contains a mixture of vegetable fat or oil, sugar, non-fat dry milk solids, and fat coated vitamins.

11 Claims, No Drawings

FOOD BAR

BACKGROUND OF THE INVENTION

1. Field of the Invention

This invention relates to a food bar fortified with protein and vitamins.

2. Description of the Prior Art

Heretofore, it has been virtually impossible to maintain high levels of heat sensitive vitamins in cooked products. The reason for this is obvious. The cooking temperatures required for cooking the product normally destroy or render virtually ineffective vitamins which are heat sensitive. Coatings for cooked food products normally consist of fat, sugar, and milk solids with possibly an emulsifier added along with the flavoring agent. Normally, cooked products which have this type of compound coating added thereto are of inferior quality. The reason for this is that products have a high fat content which turns liquid and is absorbed by the body portion of the product resulting in an unacceptable appearance and mouth feel. In the past, this problem has been minimized by increasing the melting point of the fat or oil. However, a waxy mouthfeel side effect usually limits the melting point of the coating long before the melting point approaches the upper limits of storage temperatures.

Marshmallow, as it is known today, was first shown in U.S. Pat. No. 2,600,569 to E. T. Oakes in 1952. This invention was the first showing of the injection of gas into a marshmallow mix to cause it to puff upon release of gas pressure. Since that time, many patents have issued showing different additions to marshmallows to provide different flavoring and/or other features.

The inclusion of fats in marshmallows is not a new and novel idea. In U.S. Pat. No. 3,556,012, a thorough discussion of the inclusion of fat in marshmallow is presented with the fat in this case being cocoa butter fat.

There have been teachings in the past of inclusion of vitamins in marshmallow. Such inclusion of vitamins in marshmallow, however, generally has been undesirable both from a taste standpoint and from a standpoint of destroying the marshmallow character when included therein. When it is considered that marshmallow is a water emulsion and that fats or oils generally tend to break this emulsion, then the inclusion of the carrier substance normally found with vitamins would not be a desirable direction to proceed in the marshmallow industry. Additionally, if one includes any type of other ingredients in marshmallow, it is normally not preferred to add large amounts of fat therein and especially to coat the items with fat.

It has heretofore been unknown to attempt to produce a marshmallow product having included therein a fortified marshmallow base portion with the vitamins added by a particular stable coating on the top of the marshmallow product. The resulting food bar, the product of this invention, is new and unique and has not heretofore been shown or taught by anything in the marshmallow or confection industry.

SUMMARY OF THE INVENTION

It is an object of this invention to provide a food bar fortified with proteins and vitamins.

It is a further object of this invention to provide a food bar having a marshmallow base and fortified with proteins and vitamins.

It is a further object of this invention to provide a stable, packaged food bar system.

It is an additional object of this invention to provide a process for producing a new and novel food bar.

The objects of this invention are accomplished by a food bar comprising a base and a coating therein, said base comprising marshmallow fortified with a high protein ingredient of reduced water binding capability, and said coating for the bar comprising from about 30 to 40 percent by weight sugar, from about 25 to about 50 percent by weight non-fat dry milk solids, a flavoring agent, and fat coated vitamins.

In one embodiment of this invention, the high protein ingredient is fat coated casein or caseinate salts.

In another embodiment of this invention the high protein ingredient used for fortifying the marshmallow is cereal protein which has previously been heated to denature the protein therein and to gelatinize the starch therein until the mixture is substantially incapable of binding water but with said heating not substantially destroying the efficiency of the protein portions of the cereal protein.

The objects of this invention are additionally accomplished by the combination comprising a food bar comprising a base and a coating thereon, said base comprising marshmallow fortified with a high protein ingredient of reduced water binding capability, and said coating comprising from about 30 to about 40 percent by weight vegetable fat or oil, from about 10 to 40 percent by weight sugar, from about 25 to about 50 percent by weight non-fat dry milk solids, a flavoring agent and fat coated vitamins; a hermetically sealed container completely encircling the marshmallow; a water converting catalyst within the confines of the container; and an atmosphere surrounding the food product in the container, said atmosphere comprising no more than about 4 percent by weight oxygen and the remainder of the atmosphere comprising an inert gas and sufficient hydrogen to combine with all of the oxygen and convert it to water.

The objects of this invention are additionally accomplished by a process for preparing a nutritious food bar, said process comprising:

a. preparing a base comprising marshmallow fortified by inclusion therein of protein material of reduced water binding capability;

b. preparing a coating by mixing below the degradation temperature of the vitamins a mixture comprising: from about 30 to about 40 percent by weight vegetable oil or fat, from about 10 to 40 percent by weight sugar, from about 25 to about 50 percent by weight non-fat dry milk solids, a flavoring agent, and fat coated vitamins; and c. at least partially coating the coating onto the base.

It is preferable as an extension of the process of this invention to further include the step of inserting the coated base into a container along with the water converting catalyst, displacing the atmosphere in the container with a hydrogen containing atmosphere containing not more than about 4 percent by weight oxygen, and then sealing the container to prevent further oxygen from reaching the food far. It is also preferable in the process of this invention to provide vitamins therein which are partially stabilized against degradation by coating them with an edible fatty material, said fatty material comprising a saturated aliphatic acid having between 12 and 20 carbon atoms inclusive or a glyceride having the formula:

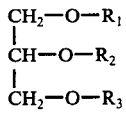

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

The preferable method of coating the vitamins in the above-described invention is one in which the fatty material is coated according to the process of admixing from 5–50 parts by weight of the heat sensitive vitamins, and from 95–50 parts by weight of the edible liquified fatty material with a cooling agent, said cooling agent having a temperature below 32° F., and said cooling agent being admixed in an amount sufficient to solidify the mixture and maintain the mixture solidified throughout the vitamin coating process, with said cooling agent being non-toxic and chemically inert with respect to the vitamins and fatty material; subdividing the total fatty material-vitamin mixture until a major portion thereof passes through a No. 20 U.S. Sieve but has a particle size above about 75 microns; and removing the cooling material therefrom by sublimation or evaporation.

The objects of this invention include an accomplishment by coating the marshmallow base with a coating comprising from about 30 to about 40 percent by weight vegetable oil or fat, from about 10 to 40 percent by weight sugar, from about 25 to 50 percent by weight non-fat dry milk solids, and a flavoring agent. The coating may also contain an emulsifier in an amount of up to 1 percent by weight with the preferred emulsifier being lecithin.

The coating compositions for use in this invention include from about 10 percent by weight to 40 percent by weight sugar. The sugar may be any blend of mono-, di-, tri-, or other higher saccharides. For example, the sugar may be dextrose, lactose, sucrose, fructose, maltose, or combinations thereof or any of the higher saccharides present in corn syrup or combinations thereof. The dextrose or lactose may be anhydrous to hydrate it in whole or in part. Although reducing sugars may be used, it is very strongly urged that they not be in amounts greater than 5 percent by weight and preferably less than 2 percent by weight. Also the coating should be granulated to a size of from about 5 to 15 microns to get the best results.

The coating of this invention also includes from about 25 to about 50 percent by weight non-fat dry milk solids. By use herein of the term "non-fat dry milk solids" it is intended to mean the term in its normal usage in the food industry as non-fat dry milk solids are generally defined. The coating cannot have substantially below 25 percent by weight nonfat dry milk solids or else the fat will bleed into the marshmallow base when the surrounding temperature rises above 118° F., thereby, creating the problem sought to be eliminated. Additionally, above about 50 percent by weight non-fat dry milk solids causes the coating to be unacceptable.

The coating compound of this invention may include a flavoring agent which may be any flavoring agent desired to give the requisite flavor. For instance, it can be vanilla or cocoa liquor or cocoa powder or any such flavor as is normally used in food products. It must be remembered, however, that the flavoring agent cannot be added in an amount which will substantially increase any of the other ingredients, such as the flavoring agent cannot contain large amounts of fat and be added in such a level to appreciably increase the fat content of the product. If this occurs the fat must be reduced to compensate for the fat in the flavoring agent, and the fat in the flavoring agent must be taken as a portion of the fat in the total product.

The coating composition as herein claimed may contain an emulisifier in an amount of up to 1 percent by weight. The emulsifier can be any of the well known emulsifiers used in the food industry so long as it has the approximate emulsification properties of lecithin, i.e. an HLB ratio of with say about 5 points on either side of the HLB of lecithin. Lecithin is particularly acceptable for use as the emulsifier herein.

In the process of this invention the fat, sugar, and non-fat dry milk solids are mixed with the flavoring agent and emulsifier and heated while mixing to give a uniform blending thereof. The heating should be in an amount sufficient to melt the fat but not at such a temperature as to cause degradation of the moist, heat sensitive ingredients therein, i.e. not over 120° F.

The process of this invention is one in which heat sensitive vitamins are in the coating product and the coating is prepared and the heat sensitive vitamins are added thereto. In this case, the heat sensitive vitamins are added either after the heating is completed or else the heating is only for a degree which will not cause degradation of the vitamins. In other words, when heat sensitive vitamins are added to the coating, the temperature thereof is purposely kept low in order not to weaken the potency of the vitamins. After the coating is prepared, it is applied to the formed marshmallow base to coat at least a part thereof like an icing and to cause the overall product to have a large amount of stabilized, heat sensitive vitamins.

It has been found particularly desirable to coat the vitamins with a fatty merial comprising a saturated aliphatic acid having between 12 and 20 carbon atoms inclusive or a glyceride having the formula:

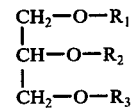

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

One particular method that has been found highly acceptable for coating the heat sensitive vitamins is to add from 5–50 parts by weight of the heat sensitive vitamins to from 95–50 parts by weight of the edible liquified fatty materials and then add this mixture to a cooling agent, the cooling agent having a temperature below 32° F. The cooling agent is added in an amount sufficient to solidify the mixture and maintain the mixture solidified throughout the vitamin coating process. The cooling agent is non-toxic and chemically inert with respect to the heat sensitive vitamins and to the fatty material. After the solidification and mixing of the materials, they are subdivided until a major portion thereof passes through a No. 20 U.S. Sieve but has a particle size greater than about 75 microns. After particle size distribution, the coating material is then removed therefrom by sublimation or evaporation. It has been found that the cooling agent can be solidified carbon dioxide (dry ice) or liquid nitrogen, and either are acceptable. It has also been found that equal Parts of the fatty material, vitamin mixture, and cooling agent are sufficient to solidify the mixture but 4 times by weight of the amount of cooling agent to liquified fatty material vitamin mixture is particularly acceptable.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup", we intend to refer to a marshmallow syrup. Depending on the method for marshmallow production, marshmallow syrup usually has a moisture content of about 16 to 30 percent by weight, very little of which is lost in processing. A more detailed description of marshmallow syrup is found later on in this discussion.

Marshmallow syrup generally has a density of approximately 127 ounces per gallon. In the production of marshmallow, marshmallow syrup is whipped and intermixed with an inert, edible gas such as air or nitrogen until the density of the mixture is approximately 44 ounces per gallon. This volumetric expansion, i.e. volume increase of 2 to 3 times, gives marshmallow the characteristic spongy texture which consumers desire. In fact these spongy and low-density texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1.0 percent by weight fat. This low fat content has been required in order to prevent excess fat from precluding expansion during whipping aeration. Since the marshmallow whip is essentially a mixture of ingredients mixed with and whipped with water, very small quantities, i.e. above 1 percent by weight, or fats or oils have heretofore broken this whip preventing the required product expansion. This is obvious since oils or fats and water do not readily mix and thus would not be thought to be a combination which could be whipped. While some attempts have been made to increase the oil of fat level in marshmallow, these attempts have generally been through the addition of certain additives which prevent the oil from breaking the emulsion or whip. While these attempts have met minor success in providing incremental increases in fat content, the additional additives have created an off-taste or foreign taste which has made the marshmallow product unacceptable.

A marshmallow mix for use in production herein includes various ingredients which as described above include various saccharides having a minimum amount of reducing sugars, water, gelatin, and flavoring agents. By use of the term "gelatin" we intend to mean a glutinous material obtained from animal tissues by prolonged boiling or any of the various substances resembling gelatin in physical properties. Gelatin is solid on the basis of bloom test or jelly test and gelatin having a bloom test or jelly test of from 150-300 grams is normally considered acceptable for marshmallow production. It is usually preferred, however, to use from 1.5 to 2.5 percent by weight of a gelatin having a bloom test of from 225-250 grams with variations in bloom test values being compensated for by using less gelatin as the bloom test value increases.

By use herein of the term marshmallow mix it is intended to mean those mixed ingredients which are whipped and aerated to produce marshmallow. These include the marshmallow syrups known in the industry, and include by reference the description found in the Krohn and Polito patent, U.S. Pat. No. 3,556,812, but with the sugars substituted to minimize the reducing sugars to below 5 percent by weight.

The process of this invention, when the requirement is for the mixing of air with the marshmallow mix until the atmospheric pressure density thereof is from about 30-74 ounces per gallon, is intended to mean those processes in which air can be injected or whipped into the marshmallow mix to give it the requisite density. For instance, the Oake type gas injection system, as previously referred to, is perfectly acceptable. Additionally, the whipping of air therein by a simple wire mixer can be sufficient so long as sufficient air is included in the product to insure the requisite density. Additionally, other new types of marshmallow equipment well known in the industry are now capable of inserting or injecting sufficient amounts of air into the marshmallow while mixing it to provide at atmospheric pressure the requisite density. If the mixing is not at atmospheric pressure, then prior to the casting or setting thereof the pressure must be reduced until it is approximately atmospheric.

Marshmallow mixes that may be used in this invention are the normal marshmallow mixes well known in the industry. Ingredients used in marshmallow production as well as amounts thereof are well known in the marshmallow industry. Among the many formulas that are acceptable for marshmallow production are those found in the following: *Candy Making As a Science and Art*, by Claude D. Barnette, Don Guessel Publications, Inc., New York, 1960, pp. 99-103and *Encyclopedia of Candy and Ice Cream Making*, by Simon I. Leon, Chemical Publishing Co., New York, 1959, pp. 294-304; and *A Textbook on Candy Making*, by Alfred E. Leighton, Manufadturing Confectioners Publishing Co., Oak Park, Illinois 1952 pp. 55-68, all modified to minimize the reducing sugars therein. A typical formula for use herein would include about 60-80 percent by weight sucrose, about 15-25 percent by weight water; about 2-5% by weight invert sugar; and about 1-4 percent by weight gelatin. The typical formula may also include some alterations of the formula, such as replacing part or all of the reducing sugars and syrups with non-reducing sugars and syrups to keep the reducing sugars below 5 percent by weight. Various flavoring agents and humectants may also be added in minor amounts. Preferably, in this invention the marshmallow mix has about 78.7% by weight sucrose, about 18.3 percent by weight water, about 1.2 percent by weight gelatin, about 2.0 percent invert syrup, and about 0.4 percent other ingredients such as flavoring, coloring and preservatives.

The density of the marshmallow produced by this invention must be from 30-74 ounces per gallon at atmospheric pressure and sufficient air must be inserted therein to produce this requisite density effect. When referring to density of the product, it is intended to refer to the density at atmospheric pressure; i.e., gas pressure removed unless it is otherwise stated.

It is preferred to maintain the aerated marshmallow mixture at a temperature of from 80° to about 90° F. during the processing, however, such other temperatures as may commonly be used in the marshmallow industry are acceptable outside of the preferred range.

In the process of this invention the marshmallow mix is first produced having therein up to about 20 percent by weight high protein ingredients of reduced water binding capability. In this case, the protein ingredient must be fat coated (casein) or heat treated (cereal protein) until it is rendered substantially incapable of binding water. After the protein ingredient has been rendered substantially incapable of binding water, it is then inserted into the marshmallow mix. The insertion into the marshmallow mix must be after the marshmallow is aerated. Air is injected or mixed into the product until the density thereof at atmospheric pressure is from 30–74 ounces per gallon. That is, when the pressure, if such exists on the marshmallow, is reduced to atmospheric, the marshmallow will expand until it has the requisite density. Likewise, if the mixing is at atmospheric pressure, the air must be mixed therein until the product has the requisite density. If any pressure is on the product then it must be reduced until it is at atmospheric pressure at which time is allowed to set.

It is preferable to package the food bar produced in this invention in a special packaging system. In this case, the food bar, after the marshmallow base is set and coated with the coating of the invention, is then inserted into a container along with a water-converting catalyst followed by displacing the atmosphere in the container with a hydrogen containing atmosphere containing not more than about 4 percent by weight oxygen, and then followed by sealing of the container to prevent further oxygen from reaching the material.

In this process, the marshmallow-based food bar is inserted into the container along with a water converting catalyst. The water converting catalyst can be any of the known catalysts that are inert with respect to the product and which are also non-toxic when included into a food package. It has been found, for instance, that it is highly desirable to use a noble metal catalyst, including such things as palladium and platinum catalysts, which are well known to convert a mixture of oxygen and hydrogen into water. It may be understood, then, that by use herein of the term "water converting catalyst" it is intended to mean a catalyst which is inert with respect to the food product, is non-toxic, and which will convert a mixture of hydrogen and oxygen to water. The catalyst can be sandwiches between breathable materials or coated onto an insert on the container wall or any method which will expose it to the hydrogen and oxygen.

After the food bar is inserted into the container with the water converting catalyst, the atmosphere thereon must be displaced with a hydrogen containing atmosphere containing not more than about 4 percent by weight oxygen. In this case, the hydrogen containing atmosphere must be an inert gas, inert with respect to the product, non-toxic, and having sufficient hydrogen to combine with the oxygen, and preferably with an excess so that there is insurance that all the oxygen is converted. Nitrogen has been found to be highly acceptable inert atmosphere for inclusion with the hydrogen. The displacing of the atmosphere with the inert gas and hydrogen can be a displacement using a flushing system which flushes completely the surrounding atmosphere in the container, or may be a double-flushing system or a combination of flushing and vacuum relief or any such combination as long as the end goal of removal of substantially all the oxygen, or at least to a maximum of about 4 percent by weight oxygen, is achieved. Thereafter, the container is sealed to prevent further oxygen from reaching the product. At such time, gradually over the containing of the product, the catalyst converts the oxygen and hydrogen to water, and the water thus produced is absorbed by the product. The amount of produced water is so small that it does not have a harmful effect on the product. In such a case, no oxygen is remaining in the free state for a combination with either the protein in the base of the food bar, or the vitamins, or other ingredients in the coating of the food bar. This prevents any type of oxygenation of any of the materials in the ingredients as well as preventing the food bar from losing its moisture and becoming hard.

The food bar base of this invention must include a high protein, i.e. above 30 percent protein, ingredient of reduced water binding capability. The high protein ingredient can be a fat coated protein, and/or protein which has been heat treated to substantially reduce the water binding capability thereof.

When fat coated proteins are used, the coating must be applied prior to inclusion of the protein in the product and cannot simply be mixed with a fat containing mixture to produce an acceptable product.

When heat treated protein is used, the protein is heated to denature it and gelatinize the remaining starch therein until the protein ingredient is substantially incapable of binding water. Of course, the heating cannot be so sever that it destroys the protein efficiency ratio substantially. It has been found that a heating of 350° F. for 1/1 to 1½ minutes accomplishes this but other such times and temperatures that produce an equivalent result are acceptable and with one skilled in the art of heat treating protein materials.

When casein or caseinate salts are coated with fat and then used in this invention, they are not heated since there is no starch in casein or caseinate salts which must be treated to prevent water absorption. It is mandatory, however, that the fat be mixed with the casein or caseinate salts prior to their inclusion in the marshmallow product. In other words, the marshmallow mix cannot be provided with fats therein and the casein or caseinate salts added thereto with the intention that they are absorbed within the marshmallow. In such a case, the casein or caseinate salts will swell due to absorption of moisture and are then not useful in providing an acceptable product.

One of the most important vitamins for use in the coating process of this invention is vitamin C.

DESCRIPTION OF THE PREFERRED EMBODIMENTS

This invention may be more fully described but is not limited by the following examples.

EXAMPLE 1

A food base is prepared. For preparation of the food base a marshmallow mix is prepared. For the mixture 0.927 parts by weight gelatin (bloom test strength 250 grams) is added to a first jacketed kettle containing 8.2 parts by weight water. The gelatin is allowed to soak in the water for 5 minutes and then steam is introduced into the jacketed kettle until the temperature of the mixture is 145° F. While maintaining the mixture at 145° F., the mixture is stirred until all the gelatin is dissolved in the water. The mixture is then set aside for inclusion in the process. This mixture is referred to as the gelatin mix. The marshmallow premix is prepared in a second jacketed kettle. For the marshmallow premix 8.3 parts by weight water, 0.067 parts by weight preservative, 77.2 parts by weight sucrose, 0.046 parts by weight flavoring (vanilla) and 0.21 parts by weight color are added to the jacketed kettle. These ingredients are then stirred until completely mixed. The marshmallow mixture or marshmallow syrup is then prepared by adding the gelatin mix prepared in the first jacketed kettle to the marshmallow premix in the second jacketed kettle. These ingredients are then thoroughly mixed until the mixture is uniform throughout with regard to each of the ingredients. The ingredients are circulated through a heat exchanger and the temperature is reduced to about 75° F. and maintained constant at that temperature. The mixture is then introduced in a continuous stream into an Oakes continuous marshmallow mixer and beater (The E. T. Oakes Corporation, Islip, N. Y.). The mixer is adjusted so that the aerated marshmallow mixture leaving the mixer is at a temperature of 85° F. plus or minus 3° F. Air is injected into the mixture and the flow rate and pressure of the air are adjusted until samples of the product exposed to atmospheric pressure have a density of about 45-55 ounces per gallon. Pressure of the aerated mixture leaving the mixer is found to fluctuate within the range of about 40-60 psig. The mixture is then introduced into the atmosphere whereupon it expands and has a density of about 50 ounces per gallon. Casein in an amount of 10 parts by weight is mixed with a vegetable fat until the casein's water binding capability is substantially reduced. The casein is then thoroughly mixed with the expanded marshmallow mix. The mixture is then allowed to set.

A coating is prepared by admixing 34 percent by weight emulsified hydrogenated vegetable oil, 35 percent by weight emulsified hydrogenated vegetable oil, 35 percent by weight sucrose, 30 percent by weight non-fat dry milk solids and trace amounts of vanilla and lecithin. 20 parts by weight vitamin C is mixed with 80 parts by weight hydrogenated vegetable oil having a melting point of 100° F. and 1 part by weight of this entire mixture is mixed with 4 parts by weight solidified carbon dioxide. This mixture is then subdivided until it passes through a No. 20 U.S. Sieve but has a particle size of above 75 microns. The dry ice is then allowed to sublime from the mixture. The coated vitamin C is then added into the coating produced above in an amount of 0.02 percent by weight. The product is coated onto the marshmallow base produced above. After 4 days and 8 days of storage, alternating between 70° and 118° F. with at least 4 hours at 118° F. None of the fat will be substantially absorbed into the marshmallow base and the consequent fat coated marshmallow base is found to be a highly desirable food bar. The food bar is high in nutritional content and vitamin content.

EXAMPLE 2

Example 1 is repeated with the exception that after the product is produced it is then placed in a bag along with a palladium catalyst. The palladium catalyst is sandwiched between two layers of polyethylene which are permeable to air or atmosphere sufficient to allow the air atmosphere to pass therethrough. The bag is then flushed with a mixture containing 8 parts by weight hydrogen and 92 parts by weight nitrogen. After a double flushing with this gas, the product is then sealed in the container to prevent further oxygen from entering the bag. After a period of time the product is found to be of high quality and good taste and the vitamins and proteins added thereto are found to have been stable.

EXAMPLE 3

Example 1 is repeated with the exception that the caseinate salts used as fortification are replaced with soy protein concentrate which is heated to 350° F. per 1 minute. Again, a highly acceptable product is produced.

EXAMPLE 4

Example 3 is repeated with the exception that the caseinate salts are replaced by soy protein concentrate which is heated to 350° F. for 1 minute. Again, an excellent product of good taste is produced which has vitamins and proteins added thereto which are found to be very stable.

It may thus be seen that this invention provides a totally new and novel product that makes use of vitamins added to marshmallow in a completely different manner, that is, in a manner of applying it by a new and novel coating. Additionally, the marshmallow product of this invention is fortified by use of a protein ingredient of reduced water binding capability and this has heretofore never been known. The resulting food bar and the process for producing it is new and novel and overcome deficiencies of all the prior art.

Having fully described this new and unique invention the following is claimed:

1. A food bar comprising:
    A. a base; and
    B. a coating thereon;
    C. said base comprising marshmallow fortified with a high protein ingredient of reduced water binding capability, selected from the group consisting of heat treated protein, fat coated protein and combinations thereof, said high protein ingredient having a protein content of at least 30 percent by weight;
    D. said coating comprising from about 30 to about 40 percent by weight vegetable fat or oil, from about 10 to 40 percent by weight sugar, from about 25 to about 50 percent by weight non-fat dry milk solids, a flavoring agent, and fat coated vitamins.

2. A food bar as in claim 1 wherein the high protein ingredient is fat coated casein or caseinate salts.

3. A food bar as in claim 1 wherein the high protein ingredient is cereal protein which has previously been heated to denature the protein therein and to gelatinize the starch therein until the cereal portion is substantially incapable of binding water but with said heating not substantially destroying the efficiency of the protein portion of the cereal protein.

4. In combination:
    A. a food bar comprising a base and a coating thereon, said base comprising marshmallow fortified with a high protein ingredient of reduced water binding capability selected from the group consisting of heat treated protein, fat coated protein and combinations thereof, said high protein ingredient having a protein content of at least 30 percent by weight, said coating comprising from about 30 to about 40 percent by weight vegetable fat or oil, from about 10 to 40 percent by weight sugar, from about 25 to about 50 percent by weight non-fat dry milk solids, a flavoring agent and fat coated vitamins;
B. a hermetically sealed container completely encircling the food bar;
C. a water converting catalyst within the confines of the container; and
D. an atmosphere surrounding the food product in the container, said atmosphere comprising no more than about 4 percent by weight oxygen and the remainder of the atmosphere comprising an inert gas and sufficient hydrogen to combine with all of the oxygen and convert it to water.

5. A process for preparing a nutritious food bar, said process comprising:
A. preparing a base comprising marshmallow fortified by inclusion therein of protein material of reduced water binding capability, said protein material selected from the group consisting of heat treated protein, fat coated protein and combinations thereof, said high protein ingredient having a protein content of at least 30 percent by weight;
B. preparing a coating by mixing below the degradation temperature of the vitamins a mixture comprising from about 30 to about 40 percent by weight vegetable oil or fat, from about 10 to 40 percent by weight sugar, from about 25 to about 50 percent by weight non fat dry milk solids, a flavoring agent, and fat coated vitamins; and
C. at least partially coating the coating onto the base.

6. A process as in claim 5 further including inserting the coated base into a container along with a water converting catalyst; displacing the atmosphere in the container with a hydrogen containing atmosphere containing not more than about 4 percent by weight oxygen; and sealing the container to prevent further oxygen from reaching the food bar.

7. A process as in claim 5 wherein the vitamins are partially stabilized against degradation by coating them with an edible liquified fatty material, said fatty material comprising a saturated aliphatic acid having between 12 and 20 carbon atoms inclusive or a glyceride having the formula:

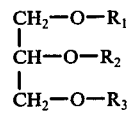

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° to 200° F.

8. A process as in claim 5 wherein the fatty material is coated according to the process of admixing from 5 to 50 parts by the weight of the heat sensitive vitamins with from 95 to 50 parts by weight of the edible liquified fatty material and with a cooling agent, said cooling agent having a temperature below 32° F. and said cooling agent being admixed in an amount sufficient to solidify the mixture and maintain the mixture solidified throughout the vitamin coating process, with said cooling agent being nontoxic and chemically inert with respect to the vitamins and fatty material; subdividing the total fatty material-vitamin mixture until a major portion thereof passes through a No. 20 U.S. Sieve but has a particle size above about 75 microns; and removing the cooling material therefrom by sublimation or evaporation.

9. A food bar as in claim 1 wherein the high protein ingredient is fat coated.

10. A food bar as in claim 1 wherein the high protein ingredient is protein which has previously been heated to denature the protein therein and to gelatinize the starch therein until the protein is substantially incapable of binding water but with said heating not substantially destroying the efficiency of the protein.

11. A food bar as in claim 1 wherein the high protein ingredient is fat coated protein and protein which has previously been heated to denature the protein therein and to gelatinize the starch therein until the cereal portion is substantially incapable of binding water but with said heating not substantially destroying the efficiency of the protein portion of the cereal protein.

* * * * *

UNITED STATES PATENT OFFICE
CERTIFICATE OF CORRECTION

PATENT NO. : 4,038,423
DATED : July 26, 1977
INVENTOR(S) : James R. Hayward, William L. Keyser and Walter J. Zielinski It is certified that error appears in the above-identified patent and that said Letters Patent are hereby corrected as shown below:

Column 2, line 62, "far" should read --bar--.

Column 4, line 40, "merial" should read --material--.

Column 7, line 27, after time and before is, insert --the mixture--.

Signed and Sealed this

Fourth Day of April 1978

[SEAL]

Attest:

RUTH C. MASON
Attesting Officer

LUTRELLE F. PARKER
Acting Commissioner of Patents and Trademarks